April 21, 1964
LEE ROY BROWN ETAL
3,129,999
OSCILLOGRAPHIC RECORDER
Filed July 7, 1960
2 Sheets-Sheet 1
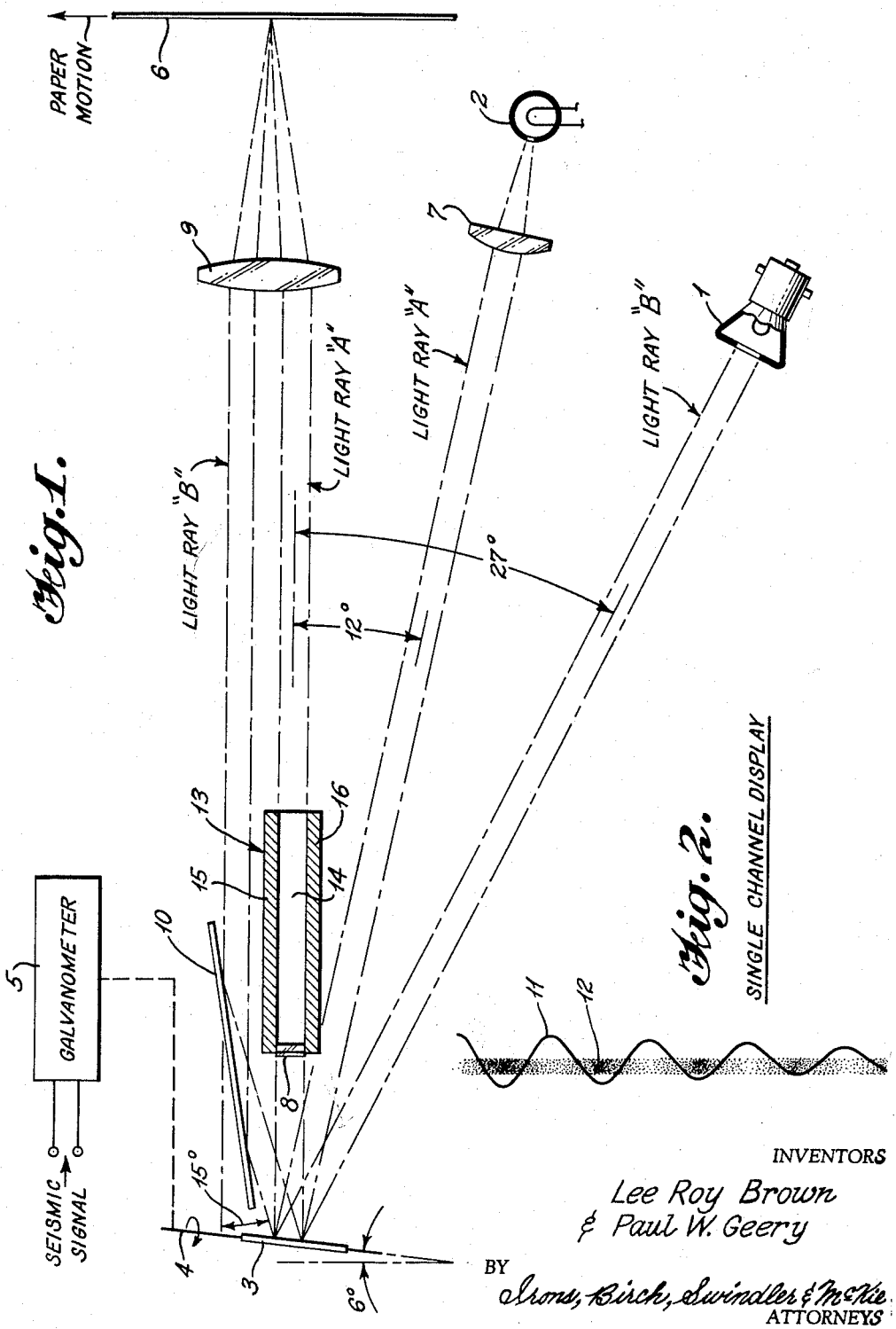
INVENTORS
Lee Roy Brown
& Paul W. Geery
BY Irons, Birch, Swindler & McKie
ATTORNEYS

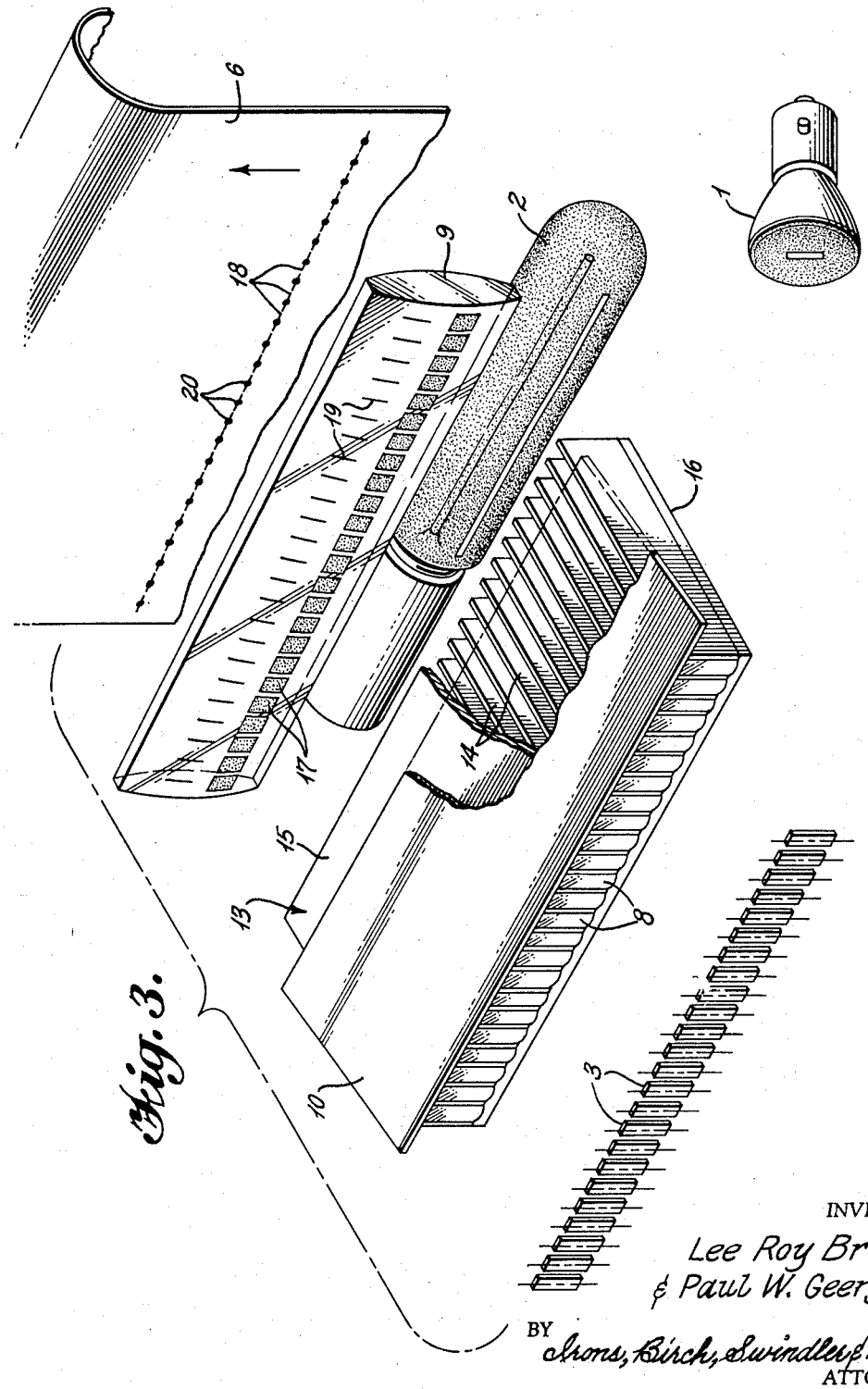

United States Patent Office 3,129,999
Patented Apr. 21, 1964

3,129,999
OSCILLOGRAPHIC RECORDER
Lee Roy Brown and Paul W. Geery, Houston, Tex., assignors to Dresser Industries, Inc., Dallas, Tex., a corporation of Delaware
Filed July 7, 1960, Ser. No. 41,287
10 Claims. (Cl. 346—109)

This invention relates to oscillographic recorders, and more particularly, to a novel apparatus for recording a variable density representation of a variable voltage, and further, to an apparatus for simultaneously recording a variable density and a variable amplitude representation of such a voltage.

In the seismic exploration field, particularly, it is necessary to record variable signals which are obtained from ground movements caused by detonation of explosives or dropping of weights onto the ground. These movements are conventionally translated into electrical voltages by seismic detectors, or geophones, arranged at different locations with respect to the shot or weight-dropping position. In order that the seismic signals can be examined to determine the characteristics of the strata underneath the surface of the earth, the seismic signals must be recorded in visual manner. Oscillographic recorders are frequently used for this purpose. In such recorders, each voltage is supplied to a different mirror galvanometer to oscillate the mirror about an axis by an amount dependent upon the instantaneous magnitude and direction, or phase, of the seismic voltage. The mirrors are positioned to receive light energy from an appropriate source and to reflect such energy onto a moving light-sensitive record member. Such recordings may be of the variable amplitude or so-called "wiggle trace" type, but it is frequently desirable to supply a trace which varies in density, rather than amplitude, in accordance with the instantaneous magnitude of the seismic signal.

It has previously been proposed that variable density traces be made by applying each seismic voltage to a different light source which delivers light energy of intensity corresponding to the magnitude of the seismic voltage. For many reasons, including the inherent time delay provided by the nature of the light source, this method of variable density recording has not been very satisfactory. It has also been suggested that variable density traces be obtained by use of a constant intensity source but with a filter positioned between the source and the galvanometer mirror, which filter has a light transmission characteristic which varies along its length. Also, the use of a light source which emits light rays of different intensity along its length has been suggested. Neither of these suggestions is completely satisfactory, and the present invention is designed to supply the need for a more satisfactory way of obtaining a variable density trace.

It was noted above that variable amplitude traces are conventionally supplied by the use of mirror galvanometers, and it was stated that it is frequently desirable to be able to supply a variable density trace. The apparatus of the present invention is designed to simultaneously provide both types of representation on a single moving photo-sensitive record member. This in itself is not a novel suggestion, because there are galvanometer recorders on the market which provide simultaneous variable amplitude and variable density traces. However, the apparatus of the present invention is designed to supply the combination of traces through use of a single set of mirror galvanometers, rather than the pair of galvanometer sets that has been employed in the past. It will be evident that the elimination of one set of galvanometers provides for a considerable reduction in cost of the apparatus and it also provides for a large reduction in size. This latter feature is particularly important for portable recorders, which are now used to great extent.

The variable density display apparatus of the present invention employs a fairly conventional light source which directs light energy of constant intensity onto the mirror of a mirror galvanometer. A portion of the light rays reflected by the mirror are directed toward the record member, the magnitude or intensity of such portion being variable with the instantaneous position of the galvanometer mirror, so that the intensity of the bundle of rays directed toward the record member varies in accordance with the amplitude of the voltage supplied to the galvanometer. Preferably this bundle of rays is focused into a narrow line extending across, or generally perpendicular to, the direction of record member movement.

The variable amplitude trace is provided by the same mirror galvanometer, by use of a second light source which directs light rays at a different angle onto the mirror, and by use of a light bending device, such as a mirror or prism, to bend the light reflected by the mirror from the second source into a direction generally parallel to the light rays which provide the variable intensity display. Preferably, also, the bundle of light rays from the second source is focused into a spot on the record member whose position is deflected across the record member in accordance with the amplitude of the applied voltage.

The apparatus of the invention will now be more fully described in conjunction with a preferred embodiment thereof shown in the accompanying drawings.

In the drawings,

FIG. 1 is a schematic side elevational view of the optical elements of the apparatus;

FIG. 2 is an idealized view of the dual trace that may be obtained by use of the apparatus of FIG. 1; and, FIG. 3 is a perspective view of the apparatus of FIG. 1, showing this apparatus arranged for multichannel recording.

The recording apparatus of the invention includes a pair of light sources 1 and 2 which are designed to transmit substantially line-sources of light energy toward the cylindrical mirrors 3 of conventional mirror galvanometers. In FIG. 1 the single mirror 3 is shown schematically as oscillatable about an axis 4 through mechanical connection to the galvanometer section 5. The electrical voltage which is to be represented or recorded is supplied to the galvanometer 5 and the galvanometer causes oscillation of the mirror in accordance with the amplitude and phase of that voltage.

The light source 1 may be an incandescent bulb with a filament arranged in straight-line fashion, or it may be a more conventional bulb which is covered with an opaque coating, with the coating scribed off in a straight-line manner, as shown in the drawings. The light source 2 may be of similar type to the source 1, but it will be noted from the drawings that the line sources of light extend substantially perpendicular to each other. Light source 1 is shown in FIG. 3 as aligned with one end of light source 2, but it may alternatively be aligned with the other end, as will be explained hereinafter. The sources must be at the same distances from the galvanometer mirrors. The light sources also are located below a photo-sensitive record member 6 which may be moved in the direction indicated in the drawings by the usual translating mechanism (not shown).

Light rays from the source 2 are formed by a plano-convex collimator lens 7 into a parallel bundle of rays identified as "light ray A." This bundle of rays is employed to provide the variable density trace and is reflected from the mirror 3 onto another plano-convex cylindrical image-forming lens 8. The lens 8, which could be spherical, as well as cylindrical, is short in the direction perpendicular to the direction of record movement, in comparison with the width of the record member, so that only a portion of the light rays reflected by the mirror 3 strike the lens 8. The magnitude or intensity of this portion of course depends upon the instantaneous position of the mirror 3 with respect to its axis 4, and the apparatus is preferably constructed so that the maximum intensity of light strikes lens 8 when the voltage applied to the galvanometer 5 is maximum in one direction. Then, the minimum amount of light will strike lens 8 when the mirror has moved to a position corresponding to the maximum amplitude of the signal voltage in the opposite direction.

It will be noted from FIG. 1 that the mirror 3 is inclined with respect to the direction of record movement by a small angle which is shown in the drawing as six degrees. This particular angle, of course, is not critical but is merely illustrated to show one way in which the elements of the apparatus may be arranged to achieve the desired function. The lens 8 may also be tilted with respect to the direction of record movement so that its longest dimension or major axis is parallel to the axis of the galvanometer mirror 3, but its position is not critical and, as shown in the drawing and used in an actual embodiment of the invention it has its major axis parallel to the direction of record movement.

Light source 2 is arranged with collimator lens 7 to direct light ray A at an angle dependent upon the inclination of the mirror, and the source shown in the drawing directs ray A at 12 degrees from the horizontal.

Lens 8 then directs a bundle of light rays toward the film, or record member 6, in parallel form, and in direction substantially perpendicular to the plane of the record member.

Another lens 9, preferably of the double convex type, though it may be plano-convex, is positioned between lens 8 and the record member and is located with respect to the record member and the lens 8 such as to focus the parallel bundles of light rays A into a line on the record member extending across its direction of movement. As indicated, the intensity of this line, and therefore the darkness of the trace will depend upon the instantaneous position of mirror 3, so that the apparatus so far described will provide a variable density display, of constant width, with the density of the line image changing with the magnitude of the seismic signal, or other voltage, supplied to galvanometer 5.

The variable amplitude display employs the light rays from source 1 which are identified in FIG. 1 as "light ray B." Light source 1 is preferably arranged with respect to the mirror 3 such that light ray B is directed toward the mirror at an angle different from that of light ray A and dependent upon the inclination of the mirror 3. In the illustrated embodiment, light ray B extends toward the mirror at 27 degrees from the horizontal. After reflection by the mirror 3, light ray B is directed upon a first surface plane mirror 10 which changes the direction of the light ray into one substantially parallel to the path of light ray A between lenses 8 and 9. In the illustrated embodiment, the mirror 10 changes the path of light ray B from an angle of 15 degrees to the horizontal, into a horizontal direction. Ray B then strikes the lens 9 and is focused thereby into a spot on the record member, that spot being preferably "in phase" with the line from light source 2. In other words, when zero voltage is applied to the galvanometer, the spot will be in the center of the line of the variable density display. The mirror 10 may, of course, be replaced by any device which is capable of changing the direction of light ray B. For instance, a prism can be used to perform this function. Also, it is not essential to the invention that the "first surface" of mirror 10 be provided with a mirror surface, though this is preferable if high fidelity is considered important.

Since the mirror 3 is oscillating about the axis 4 in accordance with variations in amplitude of the signal supplied to galvanometer 5, the position of the spot formed by light ray B will oscillate in a direction across the direction of record movement. Since the oscillation of the mirror is proportional to the signal voltage, the displacement of the spot from its neutral position will also be proportional to the magnitude of the applied voltage. This results in a representation of the type shown in FIG. 2, in which the variable amplitude trace is shown at 11, for a simple damped sine wave oscillation, while the corresponding variable density trace is shown at 12. It will be noted that the variable density trace is darkest, or of greatest density, when the magnitude of the applied voltage is maximum in one direction, and the density decreases until the constant width line formed by the variable density display is invisible when the applied voltage is maximum in the other direction. A so-called "grey level" is established when the applied voltage is zero. It will be noted from FIG. 2 that the variable intensity trace is darkest when the variable amplitude trace is deflected to its maximum extent toward the left of the figure. If the variable amplitude light source 1 were aligned with the other end of the source 2, the variable density trace would be darkest when the variable amplitude trace was maximum in the opposite direction.

If the source 1 is moved from one end of source 2 to the opposite end, the "neutral" position of galvanometer mirror 3 must also be changed. That is, the angular position of the mirror when zero voltage is applied to the galvanometer must be such as to define the "gray level" and to be oscillatable by the applied voltage from one extreme for which the variable density trace is white, to another extreme for which the trace is black. Referring now to FIG. 3, a multichannel recorder of the type described above can be formed by arranging the oscillograph mirrors 3 in a block such that they are spaced apart in a direction extending across or perpendicular to the direction of record movement. The mechanism for supporting the mirrors and for connecting them to the galvanometer is not shown, since it may be of conventional type. The image-forming lenses 8 may also be arranged in a block generally corresponding to the block of galvanometer mirrors 3, and a channel block 13 is preferably provided, in order that the light rays A corresponding to different seismic voltages may be prevented from interfering with each other. The channel block 13 comprises, principally, a plurality of opaque rectangular members 14 which extend in one dimension generally parallel to the direction of record movement, and in their longest dimension substantially perpendicular to the plane of the record member. These channel-forming members 14 have the lenses 8 positioned between them, at the entrances to the respective channels, and the elements of the apparatus are arranged so that a light ray A from any one mirror 3 can reach the record member only through the corresponding channel defined by members 14. Therefore, the channel-forming members prevent the light rays for the various traces from interfering with each other.

As is indicated in FIG. 1, the channels formed by the members 14 are also restricted by upper and lower members 15 and 16, partly to provide support for the individual members 14 and partly to restrict the dimensions of the respective light rays A and B in the direction of record movement.

As shown in FIG. 3, the mirror 10 may be supported immediately above the channel block 13, and a single mirror of length corresponding to the length of the channel block may be employed. Also, the focusing lens 9 may be of similar length, so that only a single lens is necessary. In the figure, images of light rays A and B are shown on the collimator lens 9 to indicate the form of these rays before focusing into the line and dot images on the record member. The variable density image corresponding to light ray A is changed from the block or rectangular form shown at 17 to the line form shown on the record member at 18, while the vertically-extending line image 19 of light ray B on the collimator 9 is changed to the dot form shown at 20. It will be seen that the two images are "in phase" on the record member, that is the dot is on the line when zero voltage is applied to the galvanometer. In order that this condition may obtain, the sources 1 and 2 must be at the same distances from the galvanometer mirrors. Of course, it is preferred that the "dot" be at the center of the "line" for zero applied voltage, but this is not essential.

It will be evident that many minor changes could be made in the apparatus shown as the preferred embodiment of the invention. Accordingly, the invention is not to be considered limited to that embodiment, but rather only by the scope of the appended claims.

We claim:

1. Apparatus for simultaneously recording a variable amplitude and a variable density representation of a variable voltage on a single moving photo-sensitve record member, comprising a mirror galvanometer whose mirror position is oscillatable about an axis proportionally to the amplitude of a variable voltage supplied to the galvanometer, first and second substantially line-sources of light substantially perpendicular and spaced with respect to each other and both operable to direct light rays onto said mirror, first means positioned between the mirror and the record member for forming the light rays which reach it into a first bundle of light rays directed toward the record member, said mirror and the first one of said light sources being positioned such as to reflect portions of the light rays from said first source which strike it onto said first means and therefore toward the record member, such portions being variable with the instantaneous position of the mirror, second means positioned between the mirror and the record member for forming light rays which reach it into a second bundle of light rays directed toward the record member, said second means being so positioned with respect to the second light source and the mirror as to receive rays reflected by the mirror from the second source, and third means positioned between the record member and said first and second means for forming said first bundle of light rays into a substantially line image on the record member and extending generally perpendicular to the direction of movement thereof and for simultaneously forming said second bundle of light rays into a substantially spot image on the record member.

2. The apparatus of claim 1 in which said first means includes an image-forming lens having a length in a direction perpendicular to said axis and parallel to the plane of the record member which is relatively short in comparison with the width of said record member, said lens being operable to form light rays directed upon it from the mirror into a bundle of light rays.

3. The apparatus of claim 2 in which said third means comprises a focussing lens operable to receive both said first and second bundles of light rays and to focus them in such manner that said spot image falls upon said line image when zero voltage is applied to the galvanometer.

4. Apparatus for simultaneously recording a variable amplitude and a variable density representation of a variable voltage on a single moving photo-sensitive record member, comprising a mirror glavanometer whose mirror position is oscillatable about an axis extending at a small angle with respect to the direction of record movement to angles dependent upon the amplitude of a variable voltage supplied to the galvanometer, first and second substantially line-sources of light substantially perpendicular and spaced with respect to each other and both operable to direct light rays onto said mirror and positioned such that such rays are reflected by the mirror toward the record member, a collimator lens positioned between the first one of said light source and the mirror operable to form the light rays from said first source into a parallel bundle of light rays, an image-forming lens positioned between the mirror and the record member to receive a portion of said bundle of light rays from the first source depending upon the instantaneous position of the mirror, said image-forming lens having a length in the direction perpendicular to said axis and parallel to the plane of said record member which is relatively short in comparison with the width of the record member, means operable to receive light rays from the second light source which are reflected by the mirror and to direct said rays into a direction substantially parallel to the direction of rays from said second image-forming lens, and a focussing lens positioned in the path of light rays from said image-forming lens and from said means to focus the light rays therefrom in phase upon the record member.

5. The apparatus of claim 4 in which said focussing lens is operable to focus light rays originating in the first source into a line on the record member extending perpendicular to the direction of record movement and is operable to focus the light rays originating in said second source into a spot on said line when zero voltage is applied to the galvanometer.

6. The apparatus of claim 5 in which the rest position of the mirror when zero voltage is applied to the galvanometer is such that the maximum portion of light rays originating in said first source strike said second collimator lens when the voltage applied to the galvanometer is maximum in one direction, so that the density of the line image on the record member is greatest at that time.

7. The apparatus of claim 6 in which said directing means is a mirror and said image-forming lens has its longest dimension extending parallel to the axis of the mirror.

8. Apparatus for recording on a single-moving photo-sensitive record member a variable amplitude and a variable density representation of each of a plurality of variable voltages, comprising a first substantially line-source of light extending generally perpendicular to the direction of record member movement and parallel to the plane of the record member, a second substantially line-source of light substantailly perpendicular to and spaced with respect to said first source but aligned with one end thereof, a plurality of mirror galvanometers of number corresponding to the number of voltages each of whose mirror positions is oscillatable about an axis to an extent from a rest position corresponding in sign and magnitude to the magnitude of the voltage applied to its galvanometer, said mirrors being arranged in a block extending generally perpendicular to the direction of motion and parallel to the plane of the record member with the mirrors spaced apart along that direction, said light sources being equidistant from said mirrors, a plurality of image-forming lenses arranged in a similar block with each lens opposite a different one of said mirrors and each having a length in a direction perpendicular to the direction of record movement and parallel to the plane of the record member which is relatively short in comparison with the width thereof, said image-forming lenses each being operable to direct a portion of the light rays from said first light source which are reflected from the corresponding mirror onto it toward the record member, said portion having a magnitude determined by the instantaneous position of the mirror with respect to its axis, a collimator lens between the galvanometer block and said first light source operable to form the rays therefrom into a parallel bundle of light rays, means operable to receive light rays from the second light source which are reflected by the mirrors and to direct such rays into directions substantially parallel to the direction of rays from said image-forming lenses, means positioned in the path of light rays from said means and from said plurality of image-forming lenses operable to focus light rays from the first source into a line image on the record member and extending substantially perpendicular to its direction of movement and operable to focus light rays from the second light source into a spot which falls upon the line image when zero voltage is applied to the galvanometer, and means forming a channel for light rays between each of said image-forming lenses and said last-named means to prevent light rays from one channel from following a path in another channel.

9. The apparatus of claim 8 in which said channel-forming means is a channel block having a plurality of opaque walls forming the respective channels with one of said image-forming lenses at the entrance to each channel.

10. The apparatus of claim 8 in which said last-mentioned means is a focussing lens which has a length in the direction perpendicular to the direction of record member movement and parallel to the plane of the record member at least as long as the channel block, and said directing means is a mirror of comparable length positioned between the mirror block and said focussing lens.

References Cited in the file of this patent

UNITED STATES PATENTS

| | | |
|---|---|---|
| 2,312,259 | Maurer | Feb. 23, 1943 |
| 2,426,367 | Maurer | Aug. 26, 1947 |
| 2,726,131 | Skelton | Dec. 6, 1955 |
| 2,769,683 | Skelton | Nov. 6, 1956 |
| 2,840,441 | Owen | June 24, 1958 |
| 2,875,017 | Reynolds | Feb. 24, 1959 |
| 2,937,915 | Peterson | May 24, 1960 |
| 2,946,643 | Hutchinson et al. | July 26, 1960 |
| 3,011,856 | Palmer et al. | Dec. 5, 1961 |
| 3,024,079 | Salvatori et al. | Mar. 6, 1962 |